United States Patent
Tsukasaki (10) Patent No.: US 7,740,102 B2
(45) Date of Patent: Jun. 22, 2010

(54) STEERING CONTROL DEVICE FOR VEHICLE

(75) Inventor: Yuichiro Tsukasaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 526 days.

(21) Appl. No.: 11/785,982

(22) Filed: Apr. 23, 2007

(65) Prior Publication Data

US 2007/0246287 A1  Oct. 25, 2007

(30) Foreign Application Priority Data

Apr. 24, 2006  (JP) .............................. 2006-119767

(51) Int. Cl.
*B62D 5/06* (2006.01)
*B62D 7/00* (2006.01)

(52) U.S. Cl. ........................ 180/408; 180/411

(58) Field of Classification Search ................ 180/402, 180/408, 411, 412, 409, 410, 421, 446

See application file for complete search history.

(56) References Cited

U.S. PATENT DOCUMENTS

| 7,464,785 B2 * | 12/2008 | Spark ......................... 180/236 |
| 2004/0074693 A1 * | 4/2004 | Mattson et al. ............. 180/446 |
| 2005/0234621 A1 * | 10/2005 | Lin et al. ...................... 701/41 |

FOREIGN PATENT DOCUMENTS

JP  2004-268858  9/2004

* cited by examiner

*Primary Examiner*—Lesley Morris
*Assistant Examiner*—Marc A Scharich
(74) *Attorney, Agent, or Firm*—Smith, Gambrell & Russell, LLP (57) ABSTRACT

A steering control device can shorten a braking distance during straight-traveling deceleration and can efficiently acquire the acceleration performance during straight-traveling acceleration with a simple control while maintaining the stability of a vehicle by steering the wheel on a higher road surface friction coefficient road side with a predetermined steering angle when either one of the straight-traveling braking state and the straight-traveling acceleration state of the vehicle is detected.

11 Claims, 6 Drawing Sheets

FRONT-AND-REAR WHEELS STEERING

FIG. 5B

FRONT-WHEEL STEERING

FIG. 5C

REAR-WHEEL STEERING

FIG. 6A

FRONT-AND-REAR
WHEELS STEERING

FIG. 6B

FRONT-WHEEL
STEERING

FIG. 6C

REAR-WHEEL
STEERING

FIG. 7A

FRONT-AND-REAR
WHEELS STEERING

FIG. 7B

FRONT-WHEEL
STEERING

FIG. 7C

REAR-WHEEL
STEERING

FIG. 8A

FRONT-AND-REAR
WHEELS STEERING

FIG. 8B

FRONT-WHEEL
STEERING

FIG. 8C

REAR-WHEEL
STEERING

STEERING CONTROL DEVICE FOR VEHICLE

CROSS-REFERENCE TO RELATED APPLICATIONS

The disclosure of Japanese Patent Application No. 2006-119767 filed on Apr. 24, 2006 including the specification, drawings and abstract is incorporated herein by reference in its entirety.

BACKGROUND OF THE INVENTION

1. Field of the Invention

The present invention relates to a steering control device of a vehicle properly performing a steering control in a straight-traveling braking state and in a straight-traveling acceleration state by independently steering left wheels and right wheels.

2. Description of the Related Art

Recently, with respect to a vehicle, a steering control device having various structures which can independently steer the left wheels and the right wheels (a steering control device which includes a steer-by-wire mechanism or a steering control device which includes a variable toe angle mechanism) has been developed and put into practice.

For example, Japanese Patent Unexamined Application JP-A-2004-268858 discloses a steering control system which includes a steering mechanism for independently steering left and right steering wheels and a unit for detecting lateral slide angles of the wheels, and independently controls the left and right steering wheels such that a cornering force becomes optimum for the respective left and right wheels in response to the lateral slide angles of the steering wheels so as to increase a gripping force during cornering of the vehicle.

However, in the above-mentioned system, the lateral slide angle at the center of gravity of a vehicle body is obtained based on a two-wheel model of a vehicle, a vehicle-body lateral slide angle is obtained at respective steering wheel steered positions based on the lateral slide angle at the center of gravity of the vehicle body, and the lateral slide angle of the steering wheel is obtained based on the vehicle-body lateral steering angle of the vehicle at the steering wheel steered positions. Further, the control is performed in response to the lateral slide angle of the steering wheel and hence, there exists a possibility that the responsiveness of the control is not favorable and many errors occur in the control. Further, in this system, both wheels are independently controlled in response to the cornering. Accordingly, when both wheels are controlled in a straight-traveling deceleration state or in a straight-traveling acceleration state, a braking distance is enlarged and, further, the acceleration performance can not be obtained efficiently.

SUMMARY OF THE INVENTION

The present invention has been made under such circumstances and it is an object of the present invention to provide a steering control device of a vehicle which can shorten a braking distance in a straight-traveling deceleration and can exhibit the excellent acceleration performance during straight-traveling acceleration while maintaining the stability of the vehicle with a simple control.

A first aspect of the present invention provides independent steering unit configured to independently steer a left wheel and a right wheel; straight-traveling braking/acceleration state detection unit configured to detect either one of a straight-traveling braking state and a straight-traveling acceleration state of the vehicle; road surface state detection unit configured to detect the relative difference between a left-wheel-side road surface friction coefficient and a right-wheel-side road surface friction coefficient; and steering unit configured to steer the wheel on the higher road surface friction coefficient road side with a predetermined steering angle when either one of the straight-traveling braking state and the straight-traveling acceleration state of the vehicle is detected.

A second aspect of this invention according to the first aspect, the independent steering unit is configured to independently steer the left front wheel and the right front wheel, and in the case of the straight-traveling braking state of the vehicle is detected, the steering unit steers the front wheel on the higher road surface friction coefficient road side in the vehicle-body inward direction.

A third aspect of this invention according to the first aspect, the independent steering unit is configured to independently steer the left front wheel and the right front wheel, and in the case of the straight-traveling acceleration state of the vehicle is detected, the steering unit steers the front wheel on the higher road surface friction coefficient road side in the vehicle-body outward direction.

A fourth aspect of this invention according to the first aspect, the independent steering unit is configured to independently steer the left rear wheel and the right rear wheel, and in the case of the straight-traveling braking state of the vehicle is detected, the steering means steers the rear wheel on the higher road surface friction coefficient road side in the vehicle-body outward direction.

A fifth aspect of this invention according to the first aspect, the independent steering unit is configured to independently steer the left rear wheel and the right rear wheel, and in the case of the straight-traveling acceleration state of the vehicle is detected, the steering unit steers the rear wheel on the higher road surface friction coefficient road side in the vehicle-body inward direction.

A sixth aspect of this invention according to the first aspect, independent steering unit is configured to independently steer the left front wheel and the right front wheel and to independently steer the left rear wheel and the right rear wheel, and in the case of the straight-traveling braking state of the vehicle is detected, the steering unit steers the front wheel on the higher road surface friction coefficient road side in the vehicle-body inward direction and steers the rear wheel on the higher road surface friction coefficient road side in the vehicle-body outward direction.

A seventh aspect of this invention according to the first aspect, the independent steering unit is configured to independently steer the left front wheel and the right front wheel and to independently steer the left rear wheel and the right rear wheel, and in the case of the straight-traveling acceleration state of the vehicle is detected, the steering unit steers the front wheel on the higher road surface friction coefficient road side in the vehicle-body outward direction and, steers the rear wheel on the higher road surface friction coefficient road side in the vehicle-body inward direction.

A seventh aspect of this invention according to the first aspect, the straight-traveling braking/acceleration state detection unit detects the relative difference between the left-wheel-side road surface friction coefficient and the right-wheel-side road surface friction coefficient based on a yaw rate which is generated on the vehicle.

According to the steering control device of the vehicle of the present invention, it is possible to shorten a braking distance in straight-traveling deceleration and can exhibit the excellent acceleration performance during straight-traveling acceleration while maintaining the stability of the vehicle with a simple control

DETAIL DESCRIPTION OF THE EMBODIMENTS

Hereinafter, an embodiment of the present invention is explained in conjunction with drawings.

Figure 1:
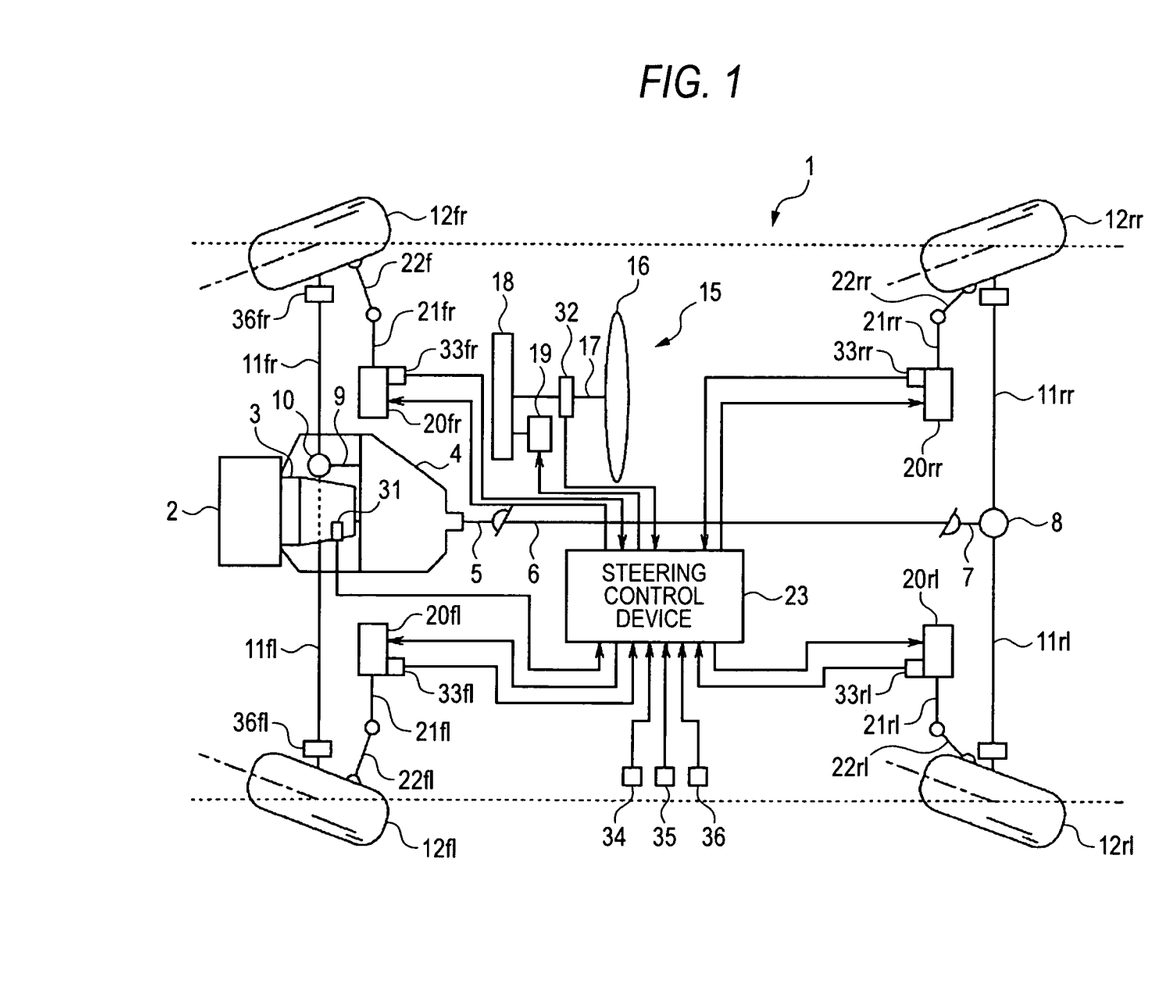
FIG. 1 is the constitutional view of a vehicle which includes a steering mechanism based on a steer-by-wire method.
Figure 2:
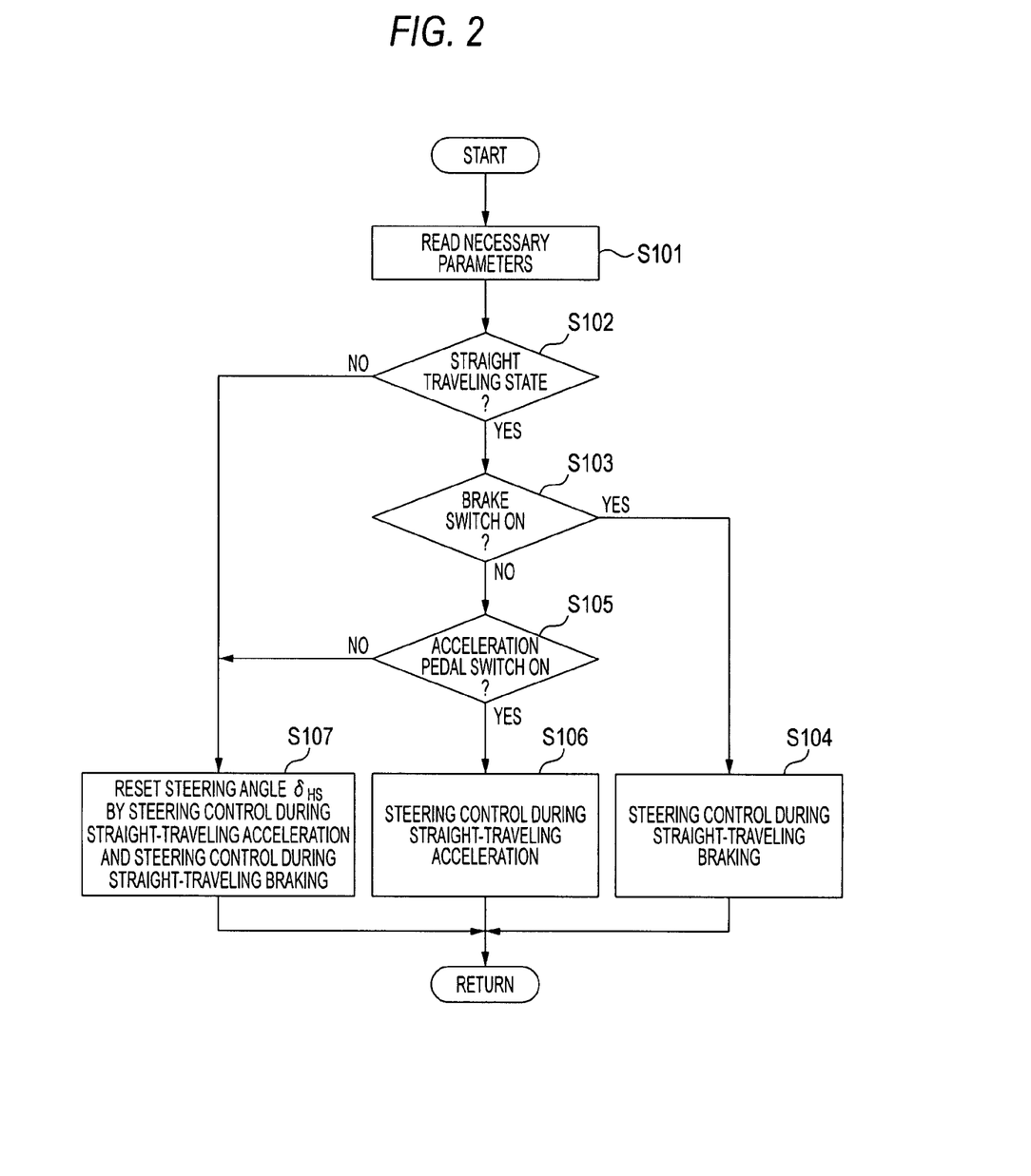
FIG. 2 is a flow chart of a steering control program.
Figure 3:
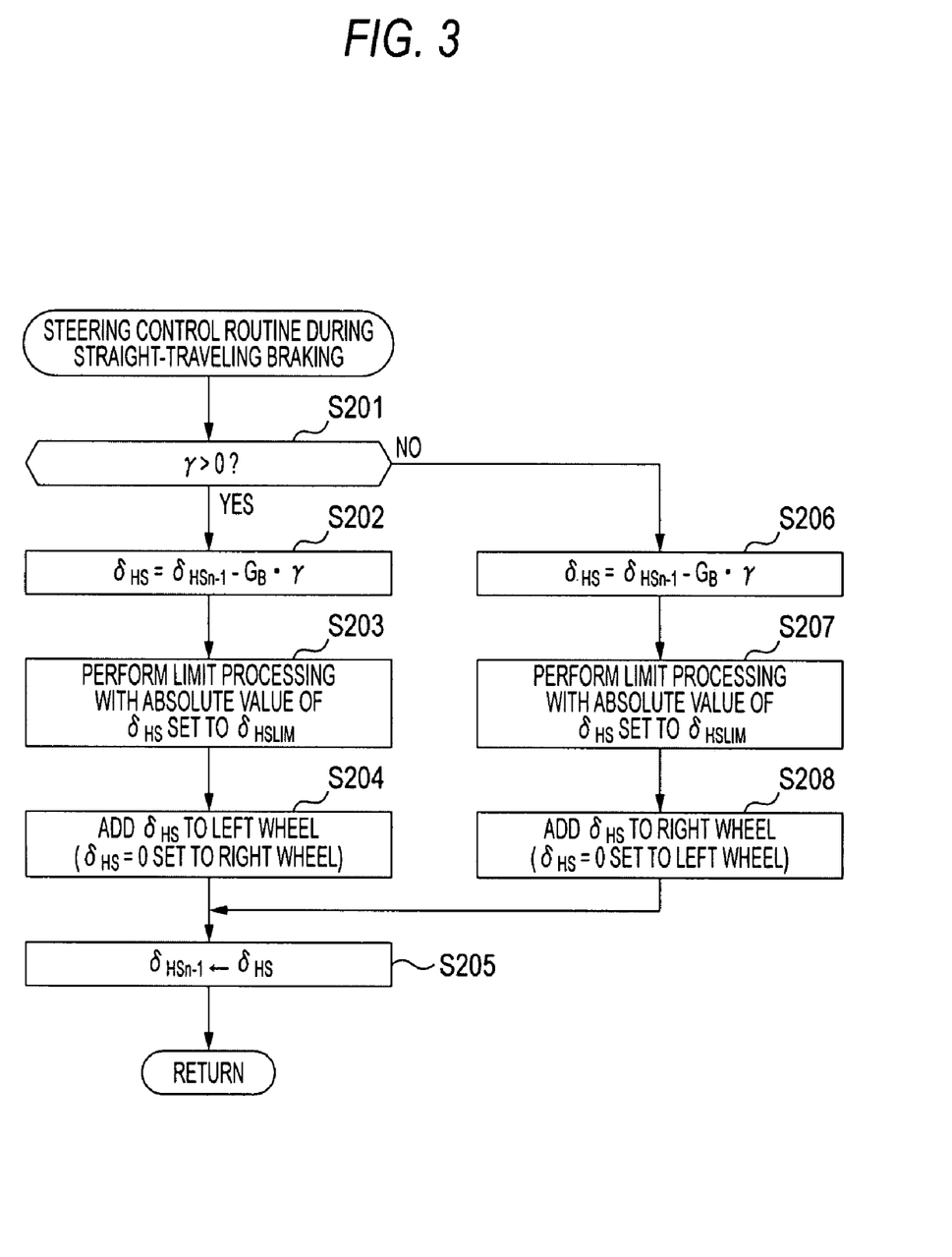
FIG. 3 is a flow chart of a steering control routine during straight-traveling braking.
Figure 4:
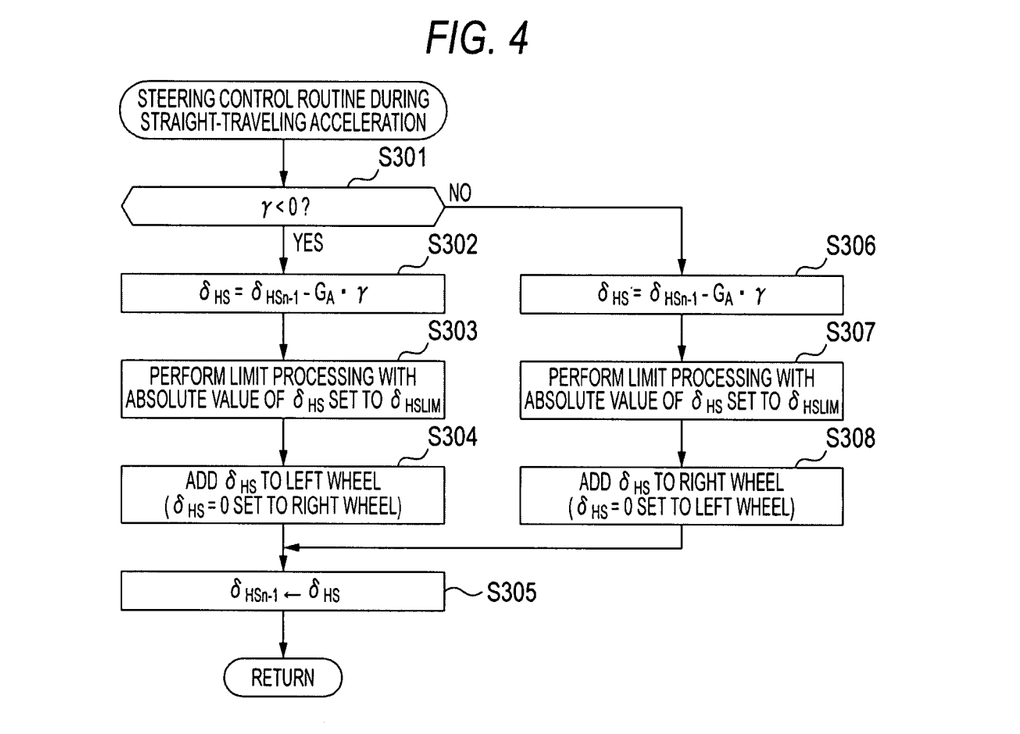
FIG. 4 is a flow chart of a steering control routine during straight-traveling acceleration.

FIG. 1 to FIG. 8 show one embodiment of the present invention, wherein FIG. 1 is the constitutional view of a vehicle which includes a steering mechanism based on a steer-by-wire method. FIG. 2 is a flow chart of a steering control program. FIG. 3 is a flow chart of a steering control routine during straight-traveling braking. FIG. 4 is a flow chart of a steering control routine during straight-traveling acceleration. FIG. 5 is an explanatory view of a left-side wheel steering control during straight-traveling braking. FIG. 6 is an explanatory view of a right-side wheel steering control during straight-traveling braking. FIG. 7 is an explanatory view of a left-side wheel steering control during straight-traveling acceleration. FIG. 8 is an explanatory view of a right-side wheel steering control during straight-traveling acceleration.

In FIG. 1, numeral 1 indicates the vehicle, and a drive force generated by an engine 2 of this vehicle 1 is transmitted to a center differential device 4 by way of an automatic transmission (shown including a torque converter or the like) 3 which is arranged behind the engine 2.

The drive force transmitted to the center differential device 4 is inputted to a rear-wheel final reduction gear unit 8 by way of a rear drive shaft 5, a propeller shaft 6, a drive pinion shaft portion 7 and, at the same time, inputted to a front-wheel final reduction gear unit 10 by way of a front drive shaft 9.

The drive force inputted to the rear-wheel final reduction gear unit 8 is transmitted to a left rear wheel 12rl through a rear-wheel left drive shaft 11rl and, at the same time, transmitted to a right rear wheel 12rr through a rear-wheel right drive shaft 11rr. Further, the drive force inputted to the front-wheel final reduction gear unit 10 is transmitted to a left front wheel 12fl through a front-wheel left drive shaft 11fl and, at the same time, transmitted to a right front wheel 12fr through a front-wheel right drive shaft 11fr.

Further, numeral 15 indicates a steering device which constitutes an independent steering unit, and a four-wheel steering mechanism which can independently control steering angles (wheel angles) of respective wheels 12fl, 12fr, 12rl and 12rr is adopted as the steering device 15 in this embodiment.

This four-wheel steering mechanism is, for example, a steer-by-wire mechanism in which the wheels 12fl, 12fr, 12rl, 12rr and a handle 16 are mechanically separated, and a relationship between a handle angle and a steering angle of respective left, right, front and rear wheels 12fl, 12fr, 12rl and 12rr can be set arbitrarily.

That is, the handle 16 which is rotatably steered by a driver is fixedly mounted on one end of a steering input shaft 17, and the other end of the steering input shaft 17 is connected to a power transmission mechanism 18. An output shaft of a motor 19 is connected to this power transmission mechanism 18. Due to such a constitution, power generated by the motor 19 is transmitted to the handle 16 as a steering reaction force by way of the power transmission system 18 and the steering input shaft 17.

In the respective wheels 12fl, 12fr, 12rl and 12rr, steering actuators 20fl, 20fr, 20rl and 20rr which constitute wheel adjustment devices are provided such that one actuator serves for one wheel.

Accordingly, the steering angles of the left and right front wheels 12fl, 12fr are independently adjusted by using a pair of the steering actuators 20fl, 20fr provided on a front-wheel side.

Further, the steering angles of the left and right rear wheels 12rl, 12rr are independently adjusted by using a pair of the steering actuators 20rl, 20rr provided to a rear-wheel side.

In the respective steering actuators 20fl, 20fr, 20rl and 20rr, drive rods 21fl, 21fr, 21rl and 21rr are inserted, and the drive rods 21fl, 21fr, 21rl and 21rr can be extended and contracted in the vehicle-width direction, that is, in the right-and-left directions corresponding to rotations of rotors (not shown in the drawing) of motors provided to the inside of the respective steering actuators 20fl, 20fr, 20rl and 20rr.

End portions of the respective drive rods 21fl, 21fr, 21rl and 21rr are connected to tie rods 22fl, 22fr, 22rl and 22rr which are joined to the respective wheels 12fl, 12fr, 12rl and 12rr. By moving the tie rods 22fl, 22fr, 22rl and 22rr interlockingly with the drive rods 21fl, 21fr, 21rl and 21rr, the wheels 12fl, 12fr, 12rl and 12rr are steered.

The left front wheel 12fl and the right rear wheel 12rr are steered in the right direction by extending the respective drive rods 21fl, 21rr, and are steered in the left direction by contracting the drive rods 21fl, 21rr. On the other hand, the steering directions of the right front wheel 12fr and the left rear wheel 12rl with respect to the extending and contracting directions are set opposite to the corresponding steering directions of above-mentioned left front wheel 12fl and the right rear wheel 12rr.

The respective steering actuators 20fl, 20fr, 20rl and 20rr are controlled by a steering control device 23. To the steering control device 23, a vehicle speed V which is detected by using a vehicle speed sensor 31, a handle angle θH outputted from a handle angle sensor 32 which is mounted on the steering input shaft 17 and detects a rotational angle from the neutral position of the handle 16 as the handle angle θH, the steering angles outputted from steering sensors 33fl, 33fr, 33rl and 33rr which are mounted on the respective steering actuators 20fl, 20fr, 20rl and 20rr and detect steering angles of the respective wheels 12fl, 12fr, 12rl, 12rr by detecting rotational angles of rotors of the respective motors, a yaw rate γ outputted from a yaw rate sensor 34, a switch signal outputted from a brake switch 35 which detects ON-OFF of a brake pedal, a switch signal outputted from an accelerator pedal switch 36 which detects ON-OFF of an accelerator pedal and the like are inputted.

Then, the steering control device 23 controls the steering reaction force given to the handle 16 by controlling the motor 19 in response to the handle angle θH and, at the same time, the steering control device 23 controls the steering angles of the respective wheels 12*fl*, 12*fr*, 12*rl* and 12*rr* respectively by controlling the respective steering actuators 20*fl*, 20*fr*, 20*rl* and 20*rr*. For example, in general, the steering control device 23 sets the steering angles of both of the left and right front wheels 12*fl*, 12*fr* to a positive phase based on the handle angle θH and, at the same time, also sets the steering angles of both of the left and right rear wheels 12*rl*, 12*rr* to the positive phase. Here, in this embodiment, the positive phase implies that the steering angle corresponds using the advancing direction as the reference, and a negative phase implies that the steering angle corresponds reversely using the advancing direction as the reference. However, the strict correspondence of the steering wheel is unnecessary. Further, the steering in the left direction is taken as a positive value.

Further, the steering control device 23 steers the wheel having the higher road surface friction coefficient with a preset steering angle in accordance with a steering control program described later when the steering control device 23 detects either one of the straight-traveling braking state and the straight-traveling acceleration state of the vehicle. That is, the steering control device 23 functions as a straight-traveling braking/acceleration state detection unit, a road surface state detection unit and a steering unit.

Hereinafter, the steering control according to the embodiment of the present invention is explained in accordance with a flow chart of the steering control program shown in FIG. 2. The program is executed for every predetermined time. First of all, in step (hereinafter alleviated as "S") 101, parameters necessary for a control, that is, the vehicle speed V, the handle angle θH, a yaw rate γ, an ON-OFF signal from a brake switch 35, an OFF-ON signal from an acceleration pedal switch 36 and the like are read.

Next, the processing advances to S102, and it is determined whether the vehicle is in the straight-traveling state or not. Here, a state is determined as the straight-traveling state when the vehicle speed V is larger than 0 and an absolute value of the handle angle θH is equal to or below a preset threshold value.

When it is determined that the state is the straight-traveling state in S102, the processing advances to S103, and it is determined whether the brake switch 35 is ON or not. When the brake switch 35 is ON, it is determined that the state is the braking-traveling state and the processing advances to S104, and the steering control during straight-traveling braking is executed thus finishing the program. Further, when a signal from the brake switch 35 is OFF, the processing advances to S105.

In S105, it is determined whether the acceleration pedal switch 36 is ON or not, and when the acceleration pedal switch 36 is ON, it is determined that the state is in the acceleration traveling state and the processing advances to S106, and the steering control during the straight-traveling acceleration described later is executed.

On the other hand, in the above-mentioned S102, when it is determined that the state is not the straight-traveling state or when the acceleration pedal switch 36 is OFF in S105, the processing advances to S107, and the steering angle δHS which is set by the steering control during straight-traveling braking and the steering control during straight-traveling acceleration up to now and the program is finished.

Next, the steering control during straight-traveling braking which is executed in the above-mentioned S104 is explained in accordance with the flow chart shown in FIG. 3.

First of all, in step S201, it is determined whether the yaw rate γ is positive (γ>0) or not. When the yaw rate γ is positive (γ>0), the processing advances to S202 to S204, and when the yaw rate γ is set to γ≦0, the processing advances to S206 to S208.

When it is determined that γ>0 in step S201 and the processing advances to step S202, the steering angle δHS is set by the steering control based on a following formula (1).

$$\delta HS = \delta HSn-1 - GB \cdot \gamma \qquad (1)$$

Here, δHSn−1 is the previously set (currently set in the steering device 15) steering angle, and GB is a gain.

Next, the processing advances to S203 and limit processing of an absolute value of the steering angle δHS is performed with a limit value δHSLIM. The limit value δHSLIM is a preset value and is set to approximately 5°, for example. Then, when the absolute value of the steering angle δHS set in the above-mentioned S202 becomes the limit value δHSLIM or more, the steering angle δHS is set to the limit value δHSLIM.

Figure 5A:
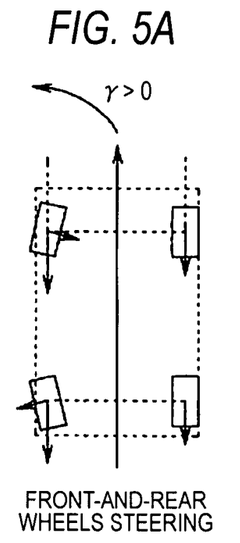
FIG. 5 is an explanatory view of a left-side wheel steering control during straight-traveling braking.

Next, the processing advances to step S204 and, as shown in FIG. 5A, the steering angles δHS are added to the front and rear wheels on a left side so as to steer the left front wheel 12*fl* in the vehicle-body inward direction and, at the same time, to steer the left rear wheel 12*rl* in the vehicle-body outward direction. Here, the steering angles δHS of the front and rear wheels on a right side are set to 0.

Figure 5B:
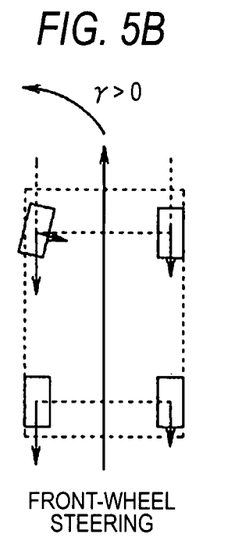
Figure 5C:
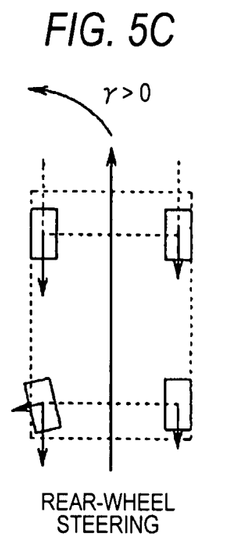

Here, in case of the steering control device which is configured to independently steer the left wheel and the right wheel only on the front wheel side, as shown in FIG. 5B, the steering angle δHS is added only to the left front wheel in the vehicle-body inward direction. To the contrary, in case of the steering control device which is configured to independently steer the left wheel and the right wheel only on the rear wheel side, as shown in FIG. 5C, the steering angle δHS is added only to the left rear wheel in the vehicle-body outward direction.

On the other hand, when it is determined that γ≦0 in step S201 and the processing advances to step S206, the steering angle δHS by the steering control is set based on the above-mentioned formula (1). Here, the steering angle δHS may be set by a formula different from the above-mentioned formula (1).

Next, the processing advances to S207 and limit processing of an absolute value of the steering angle δHS is performed with the limit value δHSLIM.

Figure 6A:
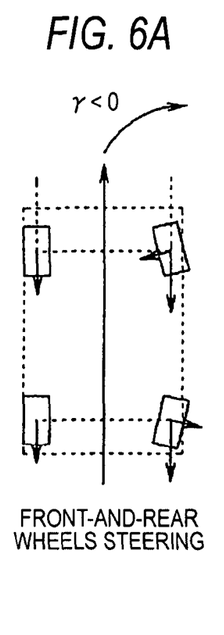
FIG. 6 is an explanatory view of a right-side wheel steering control during straight-traveling braking.

Next, the processing advances to step S208 and, as shown in FIG. 6A, the steering angles δHS are added to the front and rear wheels on a right side so as to steer the right front wheel 12*fr* in the vehicle-body inward direction and, at the same time, to steer the right rear wheel 12*rr* in the vehicle-body outward direction. Here, the steering angles δHS of the front and rear wheels on the left side are set to 0.

Figure 6B:
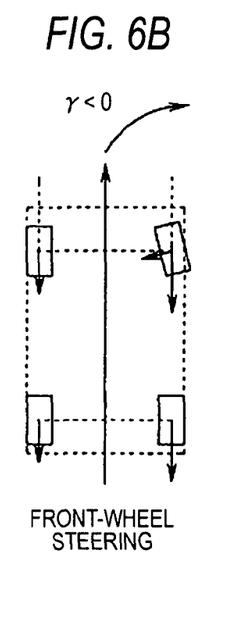
Figure 6C:
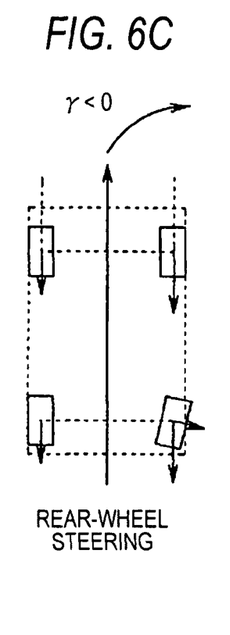

Here, in case of the steering control device which is configured to independently steer the left wheel and the right wheel only on the front wheel side, as shown in FIG. 6B, the steering angle δHS is added only to the right front wheel in the vehicle-body inward direction. To the contrary, in case of the steering control device which is configured to independently steer the left wheel and the right wheel only on the rear wheel side, as shown in FIG. 6C, the steering angle δHS is added only to the right rear wheel in the vehicle-body outward direction.

After adding the steering angle δHS in S204 or S208, the processing advances to S205 and the steering angle δHS of this time is set as the previous time steering angle δHSn−1 (δHSn−1←δHS) and the routine is finished.

That is, when the yaw rate γ is set to γ>0 during the straight-traveling braking state, as shown in FIG. 5, it is determined that a road surface μ on a left side of the vehicle is higher than a road surface μ on a right side of the vehicle. To maintain the stability of the vehicle, it is preferable to generate the yaw in the vehicle by steering the wheel to be steered on the high μ road side. Further, applying of the braking to the high μ road side is more advantageous than applying of the braking to the low μ road side to shorten the braking distance. Accordingly, when the yaw rate γ is set to γ>0, the processing in S202 to S204 is executed to perform the steering control of the left-side wheel.

Further, when the yaw rate γ is set to γ<0 during the straight-traveling braking state, as shown in FIG. 6, it is determined that the road surface μ on the right side of the vehicle is higher than a road surface μ on a left side of the vehicle. Accordingly, due to the same reason as the above-mentioned case, when the yaw rate γ is set to γ<0, the processing in S206 to S208 is executed so as to perform the steering control of the wheel on the right side.

Next, the steering control during straight-traveling acceleration executed in the above-mentioned S106 is explained in conjunction with a flow chart shown in FIG. 4.

First of all, in step S301, it is determined whether the yaw rate γ is negative (γ<0) or not. When the yaw rate γ is set to γ<0, the processing advances to S302 to S304, and when the yaw rate γ is set to γ≧0, the processing advances to S306 to S308.

When it is determined that γ<0 in step S301 and the processing advances to step S302, the steering angle δHS is set by the steering control based on a following formula (2).

$$\delta HS = \delta HSn-1 - GA \cdot \gamma \quad (2)$$

Here, GA is a gain.

Next, the processing advances to S303 and limit processing of the absolute value of the steering angle δHS is performed with the limit value δHSLIM. This limit processing is substantially equal to the processing in the above-mentioned S202, wherein the limit value δHSLIM is the preset value and is set to approximately 5°, for example. Then, when the absolute value of the steering angle δHS set in the above-mentioned S302 becomes the limit value δHSLIM or more, the steering angle δHS is set to the limit value δHSLIM.

Figure 7A:
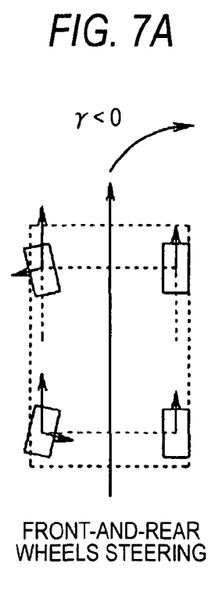
FIG. 7 is an explanatory view of a left-side wheel steering control during straight-traveling acceleration.

Next, the processing advances to step S304 and, as shown in FIG. 7A, the steering angles δHS are added to the front and rear wheels on the left side so as to steer the left front wheel 12fl in the vehicle-body outward direction and, at the same time, to steer the left rear wheel 12rl in the vehicle-body inward direction. Here, the steering angles δHS of the front and rear wheels on the right side are set to 0.

Figure 7B:
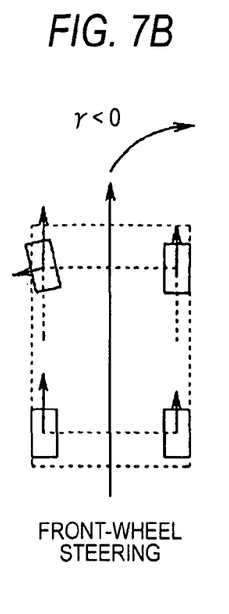
Figure 7C:
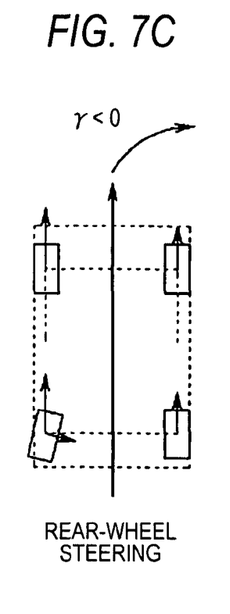

Here, in case of the steering control device is configured to independently steer the left wheel and the right wheel only on the front wheel side, as shown in FIG. 7B, the steering angle δHS is added only to the left front wheel in the vehicle-body outward direction. To the contrary, in case of the steering control device is configured to independently steer the left wheel and the right wheel only on the rear wheel side, as shown in FIG. 7C, the steering angle δHS is added only to the left rear wheel in the vehicle-body inward direction.

When it is determined that γ≧0 in step S301 and the processing advances to step S306, the steering angle δHS by the steering control is set based on the above-mentioned formula (2). Here, the steering angle δHS may be set by a formula different from the above-mentioned formula (2).

Next, the processing advances to S307 and limit processing of an absolute value of the steering angle δHS is performed with the limit value δHSLIM.

Figure 8A:
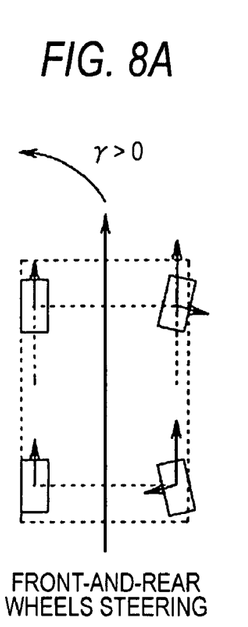
FIG. 8 is an explanatory view of a right-side wheel steering control during straight-traveling acceleration.

Next, the processing advances to S308 and, as shown in FIG. 8A, the steering angles δHS are added to the front and rear wheels on the right side so as to steer the right front wheel 12fr in the vehicle-body outward direction and, at the same time, to steer the right rear wheel 12rr in the vehicle-body inward direction. Here, the steering angles δHS of the front and rear wheels on the left side are set to 0.

Figure 8B:
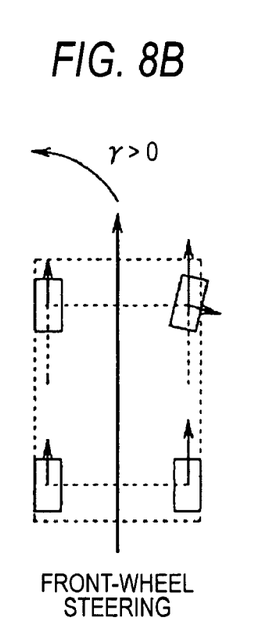
Figure 8C:
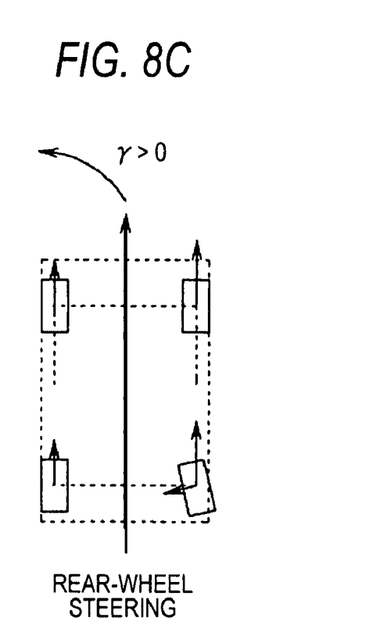

Here, in case of the steering control device is configured to independently steer the left wheel and the right wheel only on the front wheel side, as shown in FIG. 8B, the steering angle δHS is added only to the right front wheel in the vehicle-body outward direction. To the contrary, in case of the steering control device is configured to independently steer the left wheel and the right wheel only on the rear wheel side, as shown in FIG. 8C, the steering angle δHS is added only to the right rear wheel in the vehicle-body inward direction.

After adding the steering angle δHS in S304 or S308, the processing advances to S305 and the steering angle δHS of this time is set to the steering angle δHSn−1 of previous time (δHSn−1←δHS) and the routine is finished.

That is, when the yaw rate γ is set to γ<0 during the straight-traveling acceleration as shown in FIG. 7, it is determined that the road surface μ on the left side of the vehicle is higher than a road surface μ on the right side of the vehicle. To maintain the stability of the vehicle, it is desirable to generate a yaw in the vehicle by steering the steering wheel on the high μ road side. Further, also in view of allowing the vehicle to exhibit the acceleration performance efficiently, it is advantageous to perform the acceleration with the wheel on the high μ road side than on the low μ road side. Accordingly, when the yaw rate γ is set to γ<0, the processing in S302 to S304 is executed so as to perform the steering control of the wheel on the left side.

Further, when the yaw rate γ is set to γ>0 during the straight-traveling acceleration, as shown in FIG. 8, it is determined that a road surface μ on a right side of the vehicle is higher than a road surface μ on a left side of the vehicle. Accordingly, due to the same reason set forth above, when the yaw rate γ is set to γ>0, the processing in S306 to S308 is performed to perform the steering control of the vehicle on the right side.

In this manner, according to this embodiment of the present invention, the road surface state is determined simply using only the yaw rate γ obtained by the yaw rate sensor 34, the steering angle δHS to be added is determined based on the yaw rate γ, and only the wheel on the high μ road side is steered out of the right and left wheels. Accordingly, with the simple control, while maintaining the stability of the vehicle, it is possible to shorten the braking distance during straight-traveling deceleration and to acquire the efficient acceleration performance during the straight-traveling acceleration thus realizing the control with little errors and the excellent response.

Here, in this embodiment, the explanation has been made by taking the independent steering mechanism using the steer-by-wire mechanism as the example. However, it is needless to say that the present invention is applicable to an alignment variable mechanism which can vary a toe angle.

Further, in this embodiment, the explanation has been made by taking the constitution which determines whether the vehicle is during the braking traveling state or during the acceleration traveling state based on ON-OFF signals from the brake switch 35 and the acceleration pedal switch 36. However, the present invention is not limited to such an embodiment and the steering control device of the vehicle may be constituted such that, for example, the acceleration which acts on the vehicle is detected using an acceleration sensor and the steering control device determines whether the traveling state is the braking traveling state or the acceleration traveling state base on an output from the acceleration sensor.

What is claimed is:

1. A steering control device of a vehicle comprising:
   an independent steering unit configured to independently steer a left wheel and a right wheel from each other;
   a straight-traveling braking/acceleration state detection unit configured to detect either one of a straight-traveling braking state and a straight-traveling acceleration state of the vehicle;
   a road surface state detection unit configured to detect a relative difference between a left-wheel-side road surface friction coefficient and a right-wheel-side road surface friction coefficient; and
   the independent steering unit configured to steer one of the left wheel and the right wheel on the higher road surface friction coefficient road side with a predetermined steering angle when either one of the straight-traveling braking state and the straight-traveling acceleration state of the vehicle is detected.

2. The steering control device according to claim 1, wherein the independent steering unit is configured to independently steer a left front wheel and a right front wheel from each other, and in the case of the straight-traveling braking state of the vehicle being detected, the independent steering unit steers one of the left front wheel and the right front wheel on the higher road surface friction coefficient road side in a vehicle-body inward direction.

3. The steering control device according to claim 1, wherein the independent steering unit is configured to independently steer a left front wheel and a right front wheel from each other, and in the case of the straight-traveling acceleration state of the vehicle being detected, the independent steering unit steers one of the left front wheel and the right front wheel on the higher road surface friction coefficient road side in a vehicle-body outward direction.

4. The steering control device according to claim 1, wherein the independent steering unit is configured to independently steer a left rear wheel and a right rear wheel from each other, and in the case of the straight-traveling braking state of the vehicle being detected, the independent steering unit steers one of the left rear wheel and the right rear wheel on the higher road surface friction coefficient road side in a vehicle-body outward direction.

5. The steering control device according to claim 1, wherein the independent steering unit is configured to independently steer a left rear wheel and a right rear wheel from each other, and in the case of the straight-traveling acceleration state of the vehicle being detected, the independent steering unit steers one of the left rear wheel and the right rear wheel on the higher road surface friction coefficient road side in a vehicle-body inward direction.

6. The steering control device according to claim 1, wherein the independent steering unit is configured to independently steer a left front wheel and a right front wheel from each other and to independently steer a left rear wheel and a right rear wheel from each other, and in the case of the straight-traveling braking state of the vehicle being detected, the independent steering unit steers one of the left front wheel and the right front wheel on the higher road surface friction coefficient road side in a vehicle-body inward direction and steers one of the left rear wheel and the right rear wheel on the higher road surface friction coefficient road side in a vehicle-body outward direction.

7. The steering control device according to claim 1, wherein the independent steering unit is configured to independently steer a left front wheel and a right front wheel from each other and to independently steer a left rear wheel and a right rear wheel from each other, and in the case of the straight-traveling acceleration state of the vehicle being detected, the independent steering unit steers one of the left front wheel and the right front wheel on the higher road surface friction coefficient road side in a vehicle-body outward direction and, steers one of the left rear wheel and the right rear wheel on the higher road surface friction coefficient road side in a vehicle-body inward direction.

8. The steering control device according to claim 1, wherein the straight-traveling braking/acceleration state detection unit detects the relative difference between the left-wheel-side road surface friction coefficient and the right-wheel-side road surface friction coefficient based on a yaw rate which is generated on the vehicle.

9. A steering control device of a vehicle comprising:
   an independent steering unit configured to independently steer a left front wheel and a right front wheel from each other;
   a straight-traveling braking/acceleration state detection unit configured to detect either one of a straight-traveling braking state and a straight-traveling acceleration state of the vehicle;
   a road surface state detection unit configured to detect a relative difference between a left-wheel-side road surface friction coefficient and a right-wheel-side road surface friction coefficient; and
   the independent steering unit configured to steer one of the left front wheel and the right front wheel on the higher road surface friction coefficient road side in one of a vehicle-body inward direction and a vehicle-body outward direction when either one of the straight-traveling braking state and the straight-traveling acceleration state of the vehicle is detected.

10. The steering control device according to claim 9, wherein the independent steering unit is further configured to independently steer a left rear wheel and a right rear wheel from each other, and in the case of the straight-traveling braking state of the vehicle being detected, the independent steering unit further steers one of the left rear wheel and the right rear wheel on the higher road surface friction coefficient road side in the other of the vehicle-body inward direction and the vehicle-body outward direction.

11. A steering control device of a vehicle comprising:
   an independent steering unit configured to independently steer a left rear wheel and a right rear wheel from each other;
   a straight-traveling braking/acceleration state detection unit configured to detect either one of a straight-traveling braking state and a straight-traveling acceleration state of the vehicle;
   a road surface state detection unit configured to detect a relative difference between a left-wheel-side road surface friction coefficient and a right-wheel-side road surface friction coefficient; and
   the independent steering unit configured to steer one of the left rear wheel and the right wheel on the higher road surface friction coefficient road side in one of a vehicle-body inward direction and a vehicle-body outward direction when either one of the straight-traveling braking state and the straight-traveling acceleration state of the vehicle is detected.

* * * * *